Figure 1:
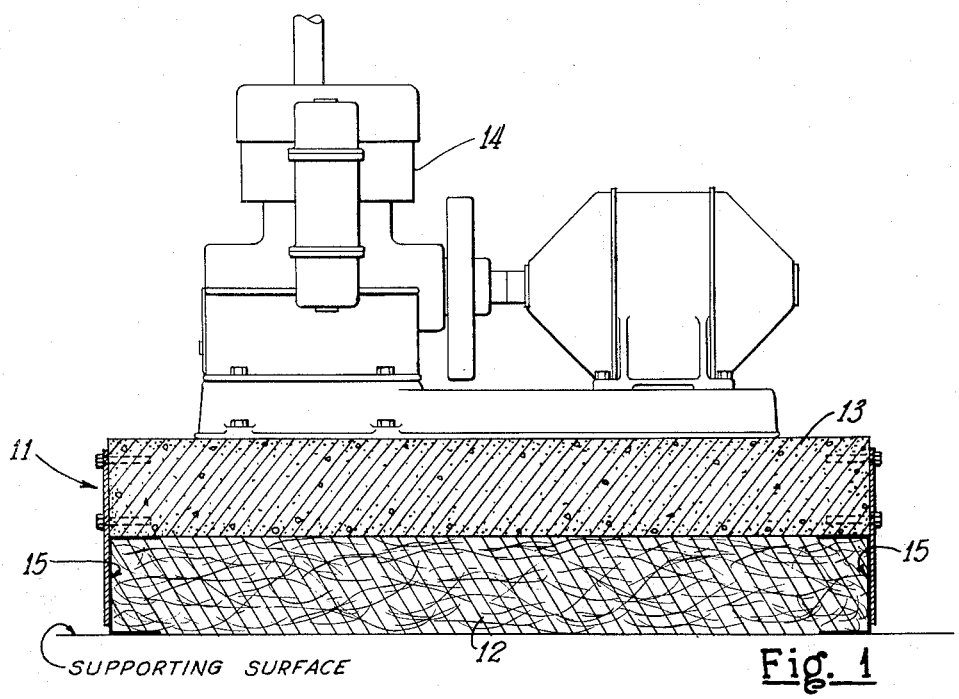

Jan. 30, 1962   G. SLAYTER   3,018,991
DAMPING PAD
Filed Feb. 20, 1959

INVENTOR.
GAMES SLAYTER
BY
ATTORNEYS

3,018,991
DAMPING PAD
Games Slayter, Newark, Ohio, assignor to Owens-Corning Fiberglas Corporation, a corporation of Delaware
Filed Feb. 20, 1959, Ser. No. 794,637
2 Claims. (Cl. 248—22)

This invention relates to an improved damping pad for isolating a source of vibration from the surroundings, and more particularly to a damping pad including a glass fiber pack with a rigid slab thereon and a wall therearound which is resistant to the passage of air.

Many types of damping pads are known in the art and and are being more commonly used as the advantages of such pads are more fully realized. Solid-borne vibrations of machinery are a constant source of irritation to persons in the vicinity even though frequently there is no conscious awareness of the vibrations. Solid-borne vibrations particularly of low frequency act as a masking noise in a room which accounts for the fact that an apparent background noise level in a room of, say, 45 db will sometimes be very bothersome to someone trying to speak in the room and at other times will seem relatively quiet if the masking background noise is of high frequency, above the voice frequencies. The use of damping pads with heavy electrical office machines to reduce disturbance to other office personnel is becoming widespread as it is realized that reduction particularly of low frequency noise has a pronounced effect on increasing the efficiency of workers, and that damping pads are particularly effective in reducing the effect of masking noise by damping vibrations transmitted from the machines through the floors on which they rest. Reduction of vibrations from machinery also has advantages other than reducing the masking noise level and increasing the comfort of occupants of adjacent areas. For example, the isolation of solid-borne vibration is important in a machine shop because the vibrations from one machine can set another adjacent machine into motion to the extent that the accuracy of the performance of the latter may be impaired. If an operation requiring close tolerance is being performed on the second machine, the vibration caused by its neighboring machine may be so severe that the tolerances cannot be held regardless of the care with which the machine is operated. The use of damping pads to isolate the offending machine will frequently correct the situation completely.

Glass fiber damping pads are increasing in use as their increased damping effectiveness over most other types of pads is becoming more widely known. Glass fiber pads are very effective in the isolation of low frequency sounds by producing a discontinuity in the path between the source of vibrations and a floor or other supporting structure through which vibrations are otherwise readily transmitted. The effectiveness of glass fiber pads appears to be due, in part, to the fact that such pads actually possess some resiliency even though they seem quite stiff and inflexible.

The present invention relates to a damping pad of glass fibers which are adhered together in a self-supporting pack of permanent shape, having an apparent density of, for example, 10 to 12 pounds per cubic foot. A rigid slab is located above the mass, between it and a machine or the like which constitutes the source of vibrations to be damped. The slab serves primarily to distribute the weight of the machine and the vibrations therefrom over the entire area of the damping pad. Further, particularly where the amplitude of the offending vibrations is large in comparison to the mass of the machine, the slab can be made larger and heavier to increase the effective mass of the machine and thereby reduce the amplitude of the vibrations and the initiation of air borne noise from it.

The new pad also includes a wall around the edges of the glass fiber pack which is resistant to the flow of air, and the wall is made continuous between the slab and the surface on which the damping pad is supported. This air resistant wall tends to maintain a cushion of air within the pad, in the interstices between the glass fibers, which not only enhances the damping properties of the pad but also increases its life. It is, of course, well known that many machines undergo rather violent vibrations during operation at a critical sped or operate through a critical resonant speed when starting or stopping. When such large but temporary vibrations occur, the slab and the glass fiber damping pad are caused to move slightly relative to each other, although such movement may be almost imperceptible. Movement of the surface of the pad results in relative movement of the fibers therein, particularly those at and near the upper surface of the pad. This relative movement eventually may cause the binder on the fibers at the points where the fibers lay across one another to wear away and expose the fibers to mutual abrasion. When this stage is reached, the bare glass fibers tend to fail relatively quickly by abrading each other whereupon fibers deeper down in the pad are subjected to the same conditions. The pad thus becomes reduced in thickness, and its damping effectiveness is decreased. The air trapped in the glass fiber body of the damping pad of the present invention by the air resistant wall provides resistance against sudden compression of the pad and relative movement of fibers therein when the pad is subjected to impact. This occurs because the entrapped air cannot escape readily when severe vibrations impact and tend to compress the pad and, therefore, the air exerts a reactive force against the bottom of the slab. This effect tends to produce added temporary rigidity in the damping pad when it is needed and decreases the relative movement of the fibers and and their resulting breakdown. On the other hand, the air has no deleterious effect on the effectiveness of the damping pad in the isolation of vibration of the normal amplitude to be expected from the continuous operation of the machine placed thereon.

It is, therefore, the primary object of the invention to provide an improved glass fiber damping pad for use as an element of a machine mounting.

Another object of the invention is to provide a glass fiber damping pad which will operate effectively over a wider range of the amplitude of imposed vibration.

Still another object of the invention is to improve the life of glass fiber damping pads by reducing the likelihood of destruction of the fibers thereof.

Figure 2:
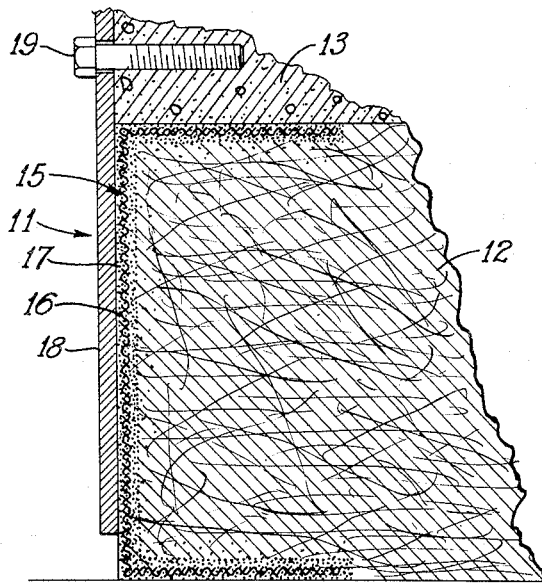

Other objects and advantages of the invention will be apparent from the following detailed description of a preferred embodiment thereof, reference being made to the accompanying drawing, in which:

FIG. 1 is a view partially in cross section of a damping pad according to the invention with apparatus supported thereon which constitutes a source of vibrations; and FIG. 2 is an enlarged fragmentary cross sectional view of the damping pad shown in FIG. 1.

Referring to the drawing, a vibration isolating or damping mounting according to the invention is indicated at 11 and includes a glass fiber pad 12, a massive weight distributing body such as a slab 13 resting thereon, a machine 14 supported by the slab, and an air resistant wall 15 around the edges of the pad 12.

The pad 12 comprises a multiplicity of randomly disposed glass fibers which can be produced and agglomerated by any of several known processes. For example, a small stream of molten glass can be subjected to high velocity streams of hot gases or vapors to draw and attenuate the glass into fine fibers. If desired, these fibers can be further attenuated into even finer fibers having a diameter as minute as 0.00005 inch by subsequently subjecting them to a blast of highly heated combustion products. The fibers are then collected into a mat which is densified to an apparent density of approximately 4 to 20 pounds per cubic foot with a density of 8 to 12 pounds per cubic foot being preferred. A suitable binder, such as a phenolic resin, is applied to the fibers either before or after the fibers are collected into a mat, and the binder is hardened after the mat is densified, to retain the shape and density of the resulting pad. The binder joins the fibers at those portions which lay over one another to establish a multiplicity of interconnections throughout the pad. The pad 12 can be built to a desired size, where necessary, by laying two or more packs of glass fibers on one another to increase the thickness of the pad, and by placing the packs end to end to increase the area of the pad.

The apparent density and the thickness of the pad 12 and the coarseness of the fibers therein affect the damping properties of the mounting 11. The particular density, thickness, and coarseness selected for a damping pad depend on the weight of the machine to be supported, in terms of loading per unit of area, the predominant frequency of the vibration intended to be damped, and the degree of reduction of vibration at that frequency which is desired. The most effective pad for a given set of conditions can be determined by known vibration tests and the results of these tests can be set up in charts or nomographs so that the most effective pack for a given set of conditions can be quickly selected. The pad 12 must have a fundamental resonant frequency considerably lower than the predominant frequency of the vibration source and is preferably selected so that the source frequency is at least two and one-half times the resonant frequency of the pad 12. For most machines, the predominant fundamental frequency of vibration is easy to determine because it is usually affected by the speed of rotation, reciprocation or oscillation of the major moving components of the machine. For example, a rotating machine having a shaft which rotates at 1200 r.p.m. will usually have a predominant fundamental frequency of vibration of 20 cycles per second because the lack of perfect dynamic balance in the shaft causes one vibration per revolution. Although there is usually more than one frequency involved when vibration is encountered, the design of the mounting 11 and pad 12 will be directed toward the predominant one. If there is more than one major vibration frequency, the design should be focused on the vibration of lowest frequency. It is generally the case that if the vibration at the lower frequency is adequately damped, the vibration at higher frequencies will be effectively isolated or damped.

The weight distributing slab 13 rests on the pad 12 but is preferably not mechanically connected thereto in any manner because fastenings extending downwardly into portions of the pad tend to concentrate vibrations at those portions and act as separate vibration sources. Of course, no fastenings can extend entirely through the pad into the supporting surface because vibrations from the machine would be transmitted directly through the fastenings and thus by-pass the pad. The slab can be made of concrete, as shown, or steel, or any other suitable stiff and preferably massive material. The material of which the slab 13 is made is not of critical consideration; it need only be sufficiently rigid to distribute the weight of the machine 14 and the vibrations produced over substantially the entire area of the pad 12. Preferably, the slab should be selected to be of sufficient mass to give some assistance in reducing the amplitude of vibration at critical speeds and during stopping and starting by increasing the mass of the system.

The wall 15 is resistant to the flow of air therethrough and is placed continuously around all exposed surfaces of the pad 12 and extends at least from the lower to the upper corners of the edge, and preferably around part of the upper and lower plane, parallel surfaces of the pad 12. In most instances, the supporting surface and the slab 13 provide sufficient resistance to the passage of air at the upper and lower surfaces of the pad 12 without the necessity of extending the material of the wall over the plane parallel surfaces of the pad for any appreciable distance. However, if the weight distributing slab 13 is not itself a continuous and air impervious body, the sheet of air resistant material 15 should be continued over any opening that might occur in the slab. Thus, if a perforate steel plate is used for the slab on which the vibration source is carried, the wall 15 should be carried over the upper surface of the paid 12 to reduce the escape of air from the interior of the pad 12 through the perforations of the plate. The wall 15 can be made of any suitable flexible material which will be incapable of transmitting directly any vibration from the machine 14 around the pad 12 to the surface on which the pad is supported. In the preferred form the wall 15 comprises a layer of glass fiber cloth 16 impregnated with asphalt 17 to increase the overall resistance of the wall 15 to the passage of air. The cloth provides greater resistance to the flow of air than does the pad and thus prevents or greatly decreases air movement into and out of the pad 12 as would otherwise occur when the paid 12 is subjected to compression by a sharp impact or by violent vibration of the machine 14. By decreasing flow of air out of the pad 12 from the interstices between the fibers forming the paid, the resistance to compression of the pad is increased without increasing its transmissibility. Less movement of the fibers in the pad 12 thereby occurs and the fibers thus have less tendency to rub together, abrade, and fail.

When thick pads are used, it is preferred to protect the edges of the pack from severe blows by the use of protective metal plates 18 fastened to the slab 13 by bolts 19. A gap must be maintained between the lower edges of the plates 18 and the supporting surface to prevent the direct transmission of vibrations through the plates to this surface.

A vibration damping mounting according to the invention thus comprises the combination of a glass fiber pad having its exposed surfaces covered with a flexible material which will reduce or eliminate the passage of air into and out of the pad, together with a weight distributing element on which the source of vibration is mounted.

Various modifications and changes will suggest themselves to those skilled in the art, and it should be expressly understood that such modifications and changes may be made without departing from the scope of the invention as defined in the appended claims.

I claim:

1. A mounting for isolating vibrations of a machine or the like which constitutes a source of vibrations, said mounting comprising a pad of randomly disposed glass fibers densified to an apparent density of from 4 to 20 pounds per cubic foot, and held in shape by a suitable binder, said pad having many interstices among said fibers, a massive weight distributing, impervious element on said pad extending over substantially all of the upper surface thereof, and a wall resistant to the passage of air extending around at least all exposed edges of said pad and extending at least from the surface on which said pad rests to the lower surface of said element comprising fabric impregnated with a plastic substance whereby said wall and said element prevent flow of air into and out of the interstices in the pad so that the air in said pad remains therein and serves as a cushion against severe vibrations.

2. A mounting for isolating vibrations from a source, said mounting comprising a pad of randomly disposed glass fibers bonded together by a resinous binder, said pad being densified to an apparent density of from 8 to 12 pounds per cubic foot, and having two parallel, main surfaces and an edge therearound, and a flexible, thin, non-load-supporting air resistant wall around all of the edge of said pad and extending completely from one main surface to the other, said air resistant wall comprising glass fiber cloth impregnated with a plastic substance, whereby air movement into and out of the interstices in the pad is prevented so that the fibers will move less and will rub together to a lesser extent.

References Cited in the file of this patent

UNITED STATES PATENTS

| | | |
|---|---|---|
| 1,958,778 | Balduf | May 15, 1934 |
| 2,769,741 | Schwartz | Nov. 6, 1956 |
| 2,854,230 | Jones | Sept. 30, 1958 |

FOREIGN PATENTS

| | | |
|---|---|---|
| 597,988 | France | Sept. 14, 1925 |